United States Patent [19]

Buhler

[11] Patent Number: 5,117,155

[45] Date of Patent: May 26, 1992

[54] METHOD AND APPARATUS EMPLOYING TWO INDEPENDENT MEANS FOR NULLING AN AMBIENT MAGNETIC FIELD

[75] Inventor: Frederick T. Buhler, Providence, R.I.

[73] Assignee: Interstate Electronics Corp., Anaheim, Calif.

[21] Appl. No.: 592,691

[22] Filed: Oct. 3, 1990

Related U.S. Application Data

[63] Continuation-in-part of Ser. No. 345,575, May 1, 1989, Pat. No. 4,963,789.

[51] Int. Cl.$^5$ .............................................. H01J 29/06
[52] U.S. Cl. ....................................................... 315/8
[58] Field of Search ..................................... 315/8, 370

[56] References Cited

U.S. PATENT DOCUMENTS

| | | | |
|---|---|---|---|
| 2,925,524 | 2/1960 | Heil | 315/8 |
| 3,757,154 | 9/1973 | Okita et al. | 315/8 |
| 4,380,716 | 4/1983 | Romeo et al. | 315/8 |

Primary Examiner—Robert J. Pascal
Attorney, Agent, or Firm—Lahive & Cockfield

[57] ABSTRACT

A method for controlling the magnetic field value within a specific volume subject to an external ambient magnetic field wherein detection means detecting the value of the ambient magnetic field in the volume is included, together with compensation means for nulling the ambient field in the volume within a predetermined compensation range. The method and apparatus includes use of a deperming means for inserting a magnetizing field independent of the compensation means into the volume whenever the value of the ambient magnetic field detected becomes greater than the predetermined compensation range.

20 Claims, 9 Drawing Sheets

METHOD AND APPARATUS EMPLOYING TWO INDEPENDENT MEANS FOR NULLING AN AMBIENT MAGNETIC FIELD

FIELD OF THE INVENTION

This application is a continuation-in-part of U.S. patent application Ser. No. 345,575, filed May. 1, 1989 and now U.S. Pat. No. 4,963,789.

This invention relates in general to a method and apparatus for controlling the magnetic field within a specified volume in an extended ambient magnetic field and more particularly to a method and apparatus which employ active magnetic field generators controlled by feedback loops to compensate for the ambient magnetic field, thereby nulling the magnetic field within the specified volume.

BACKGROUND OF THE INVENTION

The need for controlling the value of the magnetic field within a specified volume exposed to a significant ambient magnetic field, which may also be varying, arises in a number of situations. One such situation, for example, is a cathode ray tube (CRT) monitor in which the electron beam of the cathode ray tube gun is deflected magnetically to scan with precision the phosphor face of the monitor. The precision requirement is even more demanding with a color screen which requires electrons to strike the phosphor to produce specific colors by passing through holes in a shadow mask at precise angles to strike only the intended color phosphor. There have been a number of approaches employed to compensate for the effects of the extended ambient magnetic field in the operation of such monitors. Of course, one straightforward approach is the use of passive magnetic shielding. However, this is limited both as to the magnitude of field it is practical to shield, and also by the inability to surround the entire volume with shielding.

Another approach has involved the use of electrical coils positioned in locations around the monitor, which coils are energized to produce appropriate magnetic fields. In some instances, such as that described in U.S. Pat. No. 2,925,524 the fields so generated are preadjusted before the monitor is placed in operation. Another approach is described in U.S. Pat. No. 4,380,716 in which patterns at the corners of the phosphor screen are generated by a specific portion of the electron beam output path. Changes in these patterns due to changes in the ambient magnetic field are sensed by optical sensors, which in turn control the current flow through the coils, providing only axial correction. Still another approach (described in U.S. Pat. No. 3,757,154) utilizes magnetic sensors placed in a bridge to control the current flow through correcting coils. This arrangement is, however, open loop and, accordingly cannot produce magnetic fields under positive control to accomplish the compensation function.

It is therefore an object of the present invention to provide active magnetic field generators, for nulling the magnetic field within a specific volume within an ambient external field, with the energizing current for the generators being controlled by the value of magnetic field measured by a number of sensors, all included in a feedback control loop.

SUMMARY OF THE INVENTION

Broadly speaking, this invention provides a method and apparatus for controlling the magnetic field value within a specified volume by placing a number of magnetic field generators around the volume together with magnetic sensors at specified locations and using the signals from the magnetic sensors in a closed loop feedback circuit affecting all of the generators, together with a programmable processor to maintain the magnetic field within the specified volume at the specified value. In one example, the specified volume includes a CRT monitor surrounded by a $\mu$ metal shield and is therefore generally cubic with one open, unshielded display face. The individual magnetic field generators are formed of coils surrounding the CRT monitor within the shield and in a plane generally normal to the electron beam axis of the monitor. These coils are formed and positioned to have a portion of the coil oriented around this axis such that all the coils acting together can produce a magnetic field characterized by off axis vectors. The specified direction and magnitude of this vector depends upon the direction and magnitude of current supplied to the coils. Each coil has a corresponding sensor positioned to sense a specific portion of the magnetic field near the face of the monitor. These four magnetic sensors each have a primary axis of sensitivity and each is positioned in a plane normal to these axes, which are parallel to one another. The position of this sensor plane and of the individual sensors within it is such that the output of all four sensors provides a measure of the direction and magnitude of the external ambient field. The outputs of the four sensors are connected through a feedback network to all of the coils.

The system also includes a deperming coil operated by a micro processor control to provide a deperming axial field in response to specific combinations of sensor outputs, indicating the presence of an ambient field beyond the range of values which can be nulled by the magnetic field generators.

DESCRIPTION OF THE PREFERRED EMBODIMENT SYSTEM DESCRIPTION

Figure 1:
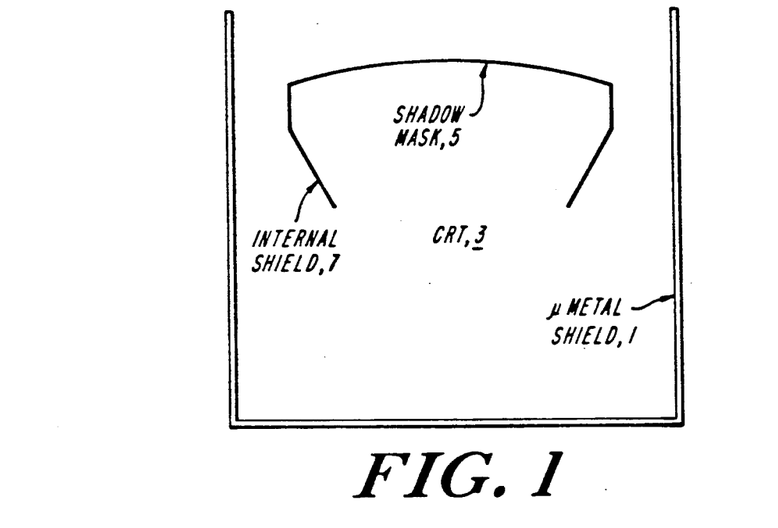
FIG. 1 is a diagram in plan view of the arrangement of a cathode ray tube (CRT) within a metal shield defining a volume.

The specific embodiment described is a system for nulling the external ambient magnetic field imposed upon a high resolution color monitor which produces a rectangular image on a shadow mask CRT 3 which has precision in line electron guns. The shadow mask 5 is shown in FIG. 1. These electron guns produce three electron beams accelerated to 25 Kev. The functioning of the CRT depends on precise control of magnetic fields along the paths of these beams since an electron moving through a magnetic field is deflected by an acceleration proportional to the cross product of its own velocity vector and the local magnetic field vector.

The electron beam of the CRT scans the image area at the CRT's light emitting phosphor screen by producing magnetic fields with electromagnets placed near the electron guns which are at the rear of the CRT. Alignment of the three electron beams so that they will all converge at the same spot on the phosphor screen also depends on magnetic fields in the gun area. The three beams pass through a shadow mask placed approximately half an inch behind the phosphor screen. The shadow mask has an array of small holes through it in an extended hexagonal pattern. The center of each hole is about 0.26 mm from the center of its nearest neighbor holes. For each hole in the mask there are three dots of phosphor on the CRT screen. These dots each emit a different color of light—red, green, or blue—when struck by high energy electrons. When properly aligned, the beams travel through the holes at different angles so that one beam strikes only red, one only green, and one only blue emitting dots. Conditions which disrupt this alignment cause loss of color purity; i.e. the colors of the image are incorrect. The angle at which the electrons pass through the mask or their subsequent path can be adversely affected by stray magnetic fields causing loss of color purity.

The nulling system described below which is illustrated in FIGS. 1 through 16 provides a neutral magnetic field in the volume occupied by the CRT and its yoke, despite ambient magnetic fields of value up to 5 oersteds, which may vary at a rate as high as 20 oersteds per second. The system of this invention neutralizes the effects of external magnetic fields by employing both passive and active means. A passive magnetic shield surrounds the CRT and yoke and extends forward a few inches beyond the CRT face The shield is spaced about the same distance from the image area on the right and left sides with a slightly smaller spacing between it and the image area at the top and bottom of the screen. Since the image area cannot be obscured, the shield is entirely open at the front. While the shield conforms generally to the CRT yoke outline, it must be sufficiently separated from the yoke so that it does not distort the deflection fields or adversely load the circuits which drive the yoke. The shield may, for example, be fabricated from 80% moly-permalloy which is typically 0.06 inches thick, except that the front four inches of the shield may be formed with a double layer to insure that the shield is not saturated by edge effects.

The magnetic shield is designed so that it does not saturate when placed in randomly oriented magnetic fields up to 6 oersteds strength. This results in significantly reduced magnetic fields within the volume which have the following properties. At each point the function describing the magnetic field orientation and magnitude is determined entirely by the orientation and magnitude of the ambient vector. That function is the same for all external fields of the same orientation except for a scalar constant which is proportional to the magnitude of the external field.

The active field neutralizing system employs a compensation means which includes a series of coils within the $\mu$ metal shield and encompassing the CRT, each lying generally in a plane normal to the electron beam axis of the CRT. Four magnetic sensors are positioned in a plane near the face of the CRT generally in each corner of it. The sensors each are oriented so that their primary axes of sensitivity are parallel to each other and normal to the sensor plane. Each sensor output produces current in an associated one of the coils, as well as providing some input signal to drive the neighboring coils. The direction and magnitude of this current is controlled by the direction and magnitude of the magnetic field sensed by the sensor. The system is calibrated such that the resultant field from all four coils opposes the externally imposed ambient field in both direction and magnitude, thus neutralizing it within the volume occupied by the CRT.

THE MAGNETIC SENSORS

FIG. 1 shows the arrangement of the primary magnetic materials in the monitor. These materials are in a $\mu$ metal shield 1, a CRT 3, a shadow mask 5 and an internal shield 7. Although highly simplified, this accurately represents the situation as far as the principles to be discussed. FIG. 1 is shown with no lines of magnetic flux present.

Figure 2:
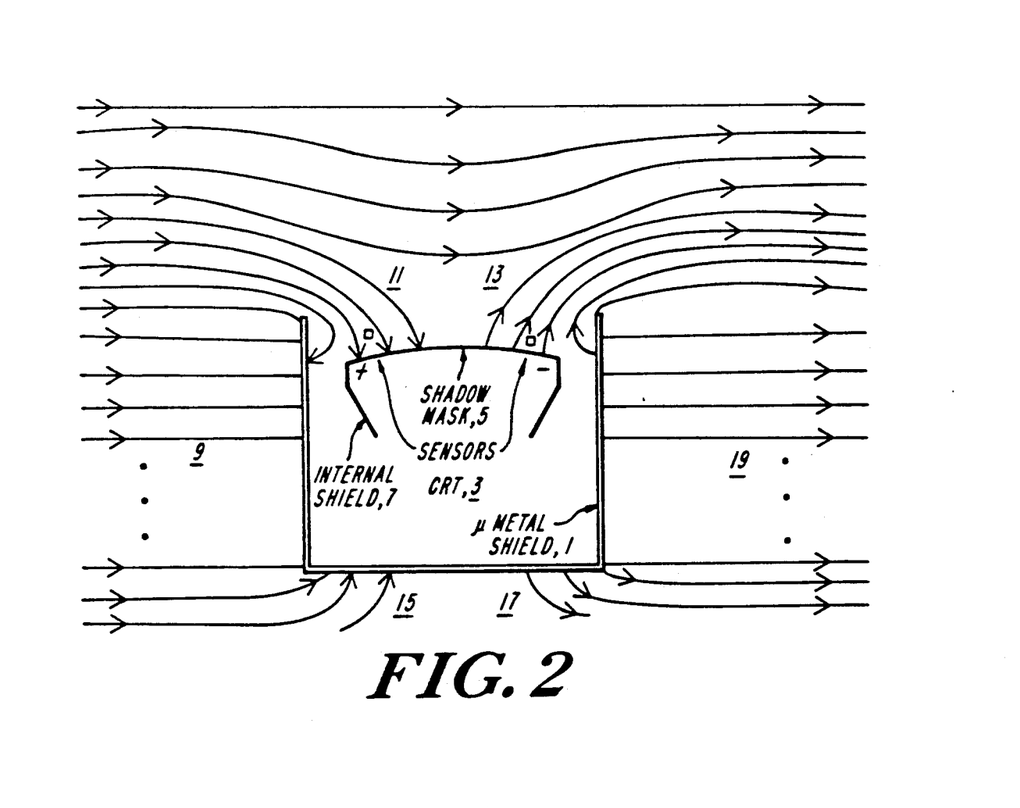
FIG. 2 is a diagram of a transverse ambient field passing through the defined volume of FIG. 1.

FIG. 2 shows lines of flux in a transverse field as they interact with the magnetic materials of the monitor. A distance away from the magnetic material the lines 9 are all oriented in the same direction and are uniformly spaced. These lines and spacing represent the direction and strength of the magnetic field. Magnetic flux has the property that it is attracted to and concentrates in objects of high permeability. It does not terminate at these objects, but continues through them. In FIG. 2, the flux lines to the extreme far left 9, or right 19, are uniformly directed to the right and of uniform spacing indicating a uniform intensity magnetic field. Both the $\mu$ metal shield 1 and shadow mask 5 have high permeability and attract and concentrate the flux. Another property of the interaction of flux and highly permeable material is that the flux lines are (approximately) normal to the surface of the material as they enter it (lines 11 and 15) and leave it (lines 13 and 17). In order to concentrate in the material, the lines of flux must bend toward it. This results in a component of the field direction which points "into" the shadow mask as it enters from the left and a component which points "out" as it exits the shadow mask at the right. Thus, if directional magnetic field sensors are placed symmetrically at the left and right side of the shadow mask with their axes of sensitivity pointing into the mask, the left sensor will indicate a field of one polarity while the sensor on the right will indicate a field of the same magnitude but of opposite polarity.

Figure 3:
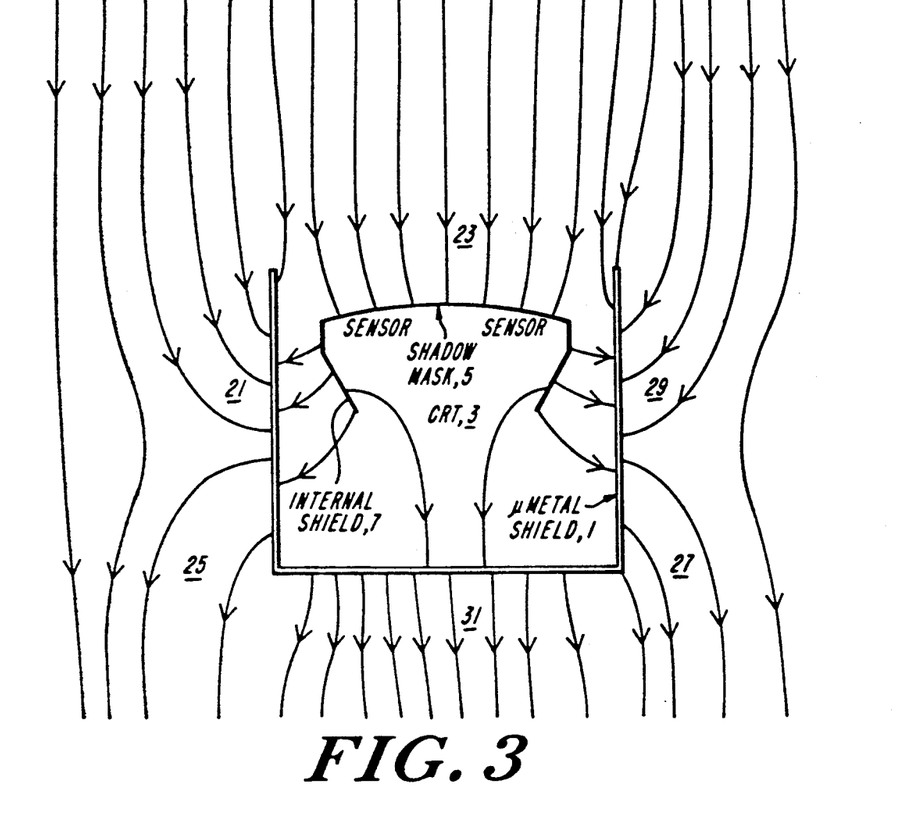
FIG. 3 is a diagram of an axial ambient field passing through a defined volume.

FIG. 3 represents the situation in which a uniform axial ambient field has been impressed upon the monitor. The same principles discussed above apply. However, the magnitude and polarity indicated by the two sensors placed at the left and right are the same (as opposed to opposite polarity in the transverse field) lines of flux 21, 23, and 29 with the volume, and lines of flux 25, 27 and 31 leave the volume.

Thus, in these two cases, the indication of the sensor at the left side is $$V_L = k_a B_a + k_t B_t$$

where: $V_L$ is an output voltage from the sensor proportional to the field strength directed along its axis of sensitivity, $B_a$ is the strength of the axial field in oersteds, $k_a$ is a constant which includes the directional coupling of the axial field to the sensor, $B_t$ and $k_t$ are analogous for the transverse field to $B_a$ and $k_a$ for the axial field. The output from the sensor on the right, assuming perfect symmetry and identical sensors, is $$V_R = k_a B_a - k_t B_t$$

since the field along the sensor axis on this side resulting from the ambient field is opposite in polarity. It is now possible to separate and quantify the field components $B_a$ and $B_t$ since, $$B_a = (V_L + V_R)/2k_a$$

$$B_t = (V_L - V_R)/2k_t$$

Figure 4:
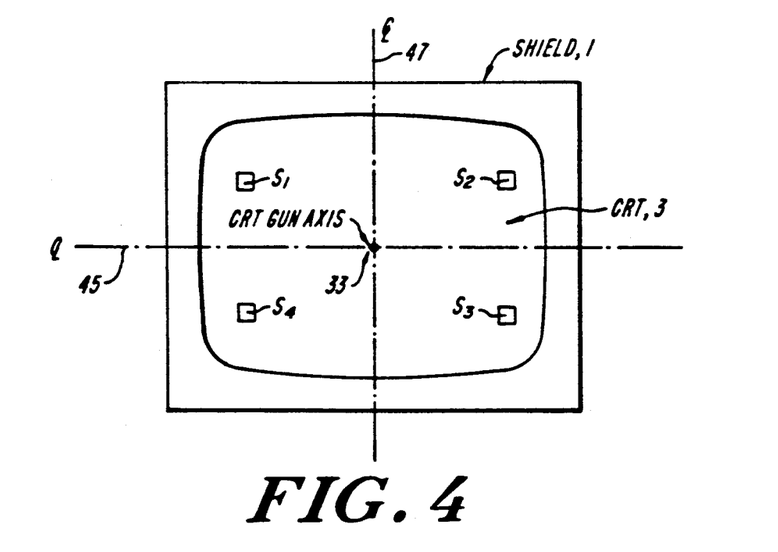
FIG. 4 is a diagram of the CRT and the sensors with respect to axial, horizontal and vertical directions.

FIG. 4 shows a front view of the monitor with the CRT placed symmetrically into the shield and four magnetic sensors placed symmetrically about the horizontal 45 and vertical 47 center lines of the assembly. The sensors $S_1$, $S_2$, $S_3$, and $S_4$ are all placed at the same distance from the shadow mask with their axes of sensitivity at the same angle (nearly parallel) with respect to the CRT gun axis 33 in a plane, which includes the sensor and the gun axis. Sensors are placed as close to the CRT image area as possible. The sensors are denoted $S_1$, $S_2$, $S_3$, and $S_4$ starting at the upper left and proceeding clockwise. The outputs of the sensors are respectively $V_1$, $V_2$, $V_3$ and $V_4$. One suitable type of sensor is a fluxgate sensor having the output signal appearing on a pickup coil and being excited by a square wave applied voltage or a sine wave voltage of appropriate frequency.

Extension of the same principles used in the two dimensional analysis shows that the following expressions accurately represent the sensor outputs.

$$V_1 = k_a B_a + k_h B_h + k_v B_v$$

$$V_2 = k_a B_a - k_h B_h + k_v B_v$$

$$V_3 = k_a B_a - k_h B_h - k_v B_v$$

$$V_4 = k_a B_a + k_h B_h - k_v B_v$$

where $k_a$ and $B_a$ are as above and $k_h$ and $B_h$ and $k_v$ and $B_v$ are analogous for the horizontal and vertical ambient vectors. The ambient vectors can be determined from $$B_a = (V_1 + V_2 + V_3 + V_4)/4k_a$$

$$B_h = (V_1 - V_2 - V_3 + V_4)/4k_h$$

$$B_v = (V_1 + V_2 - V_3 - V_4)/4k_v$$

Thus by appropriate Placement of four sensors, the three orthogonal ambient field vectors are easily resolved.

THE COMPENSATION COILS

The set of four compensation coils exhibits a effective symmetry about the CRT 3. Because of this symmetry, the compensation system is implemented with a direct, one-to-one, correspondence, of a single one-axis sensor for each coil. The system uses to effective advantage the properties of magnetic fields in the presence of magnetic material to determine the appropriate currents to pass through each compensation coils to null the magnetic field at each sensor. While the set of coils together evidences this symmetry, each coil in the set is different from the remainder of the coils. By an appropriate configuration of these coils it is possible to drive each of four coils directly from the output of one corresponding sensor without any additional manipulation of the sensor outputs.

Figure 5:
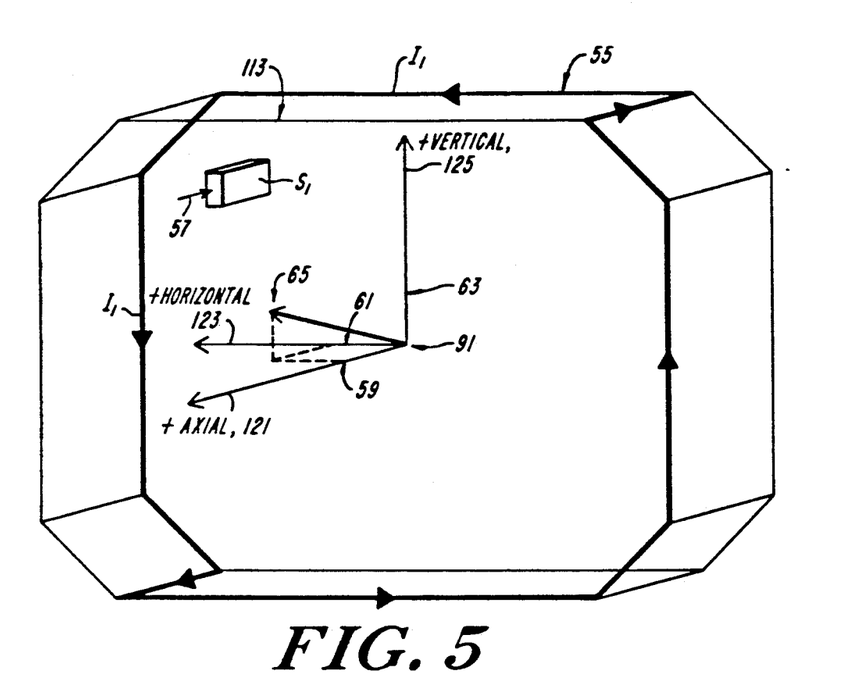
FIG. 5 is a diagram of coil 1 and sensor 1.

A suitable construction of each of the compensation coils, for many applications is formed of four hundred and thirty three turns of No. 30 copper wire, with each turn being approximately 72" in length. FIG. 5 shows coil 55 and its associated sensor $S_1$. Coil 55 is nonplanar. It has portions in each of the axial, horizontal and vertical fields. Because of the shape of coil 55, current flowing through the coil as shown in FIG. 5 generates a resultant magnetic field diagrammatically represented by vector 65. Vector 65 has components (59, 61 and 63) in each of the positive axial, positive horizontal and positive vertical directions respectively.

Figure 6:
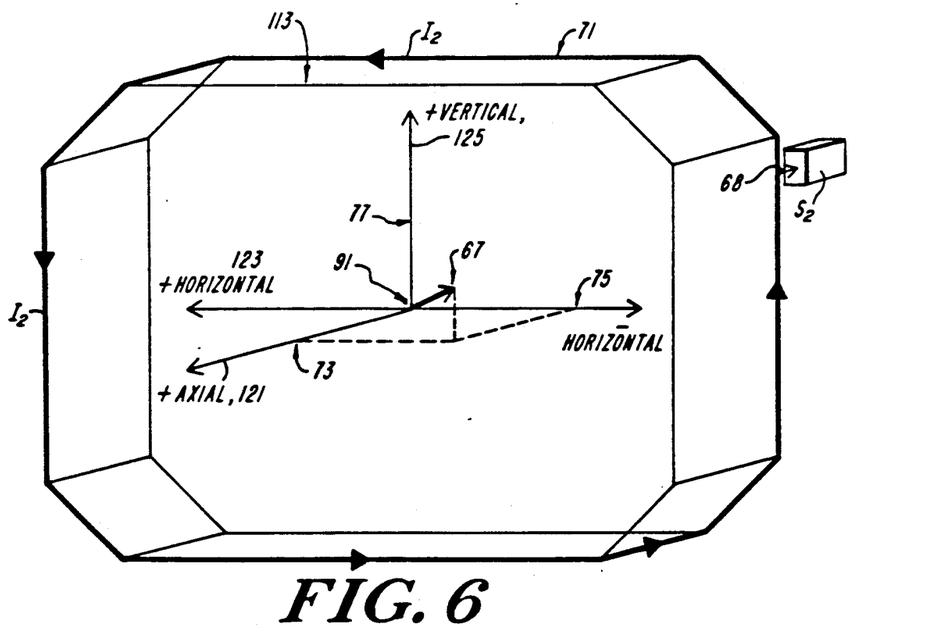
FIG. 6 is a diagram of coil 2 and sensor 2.
Figure 7:
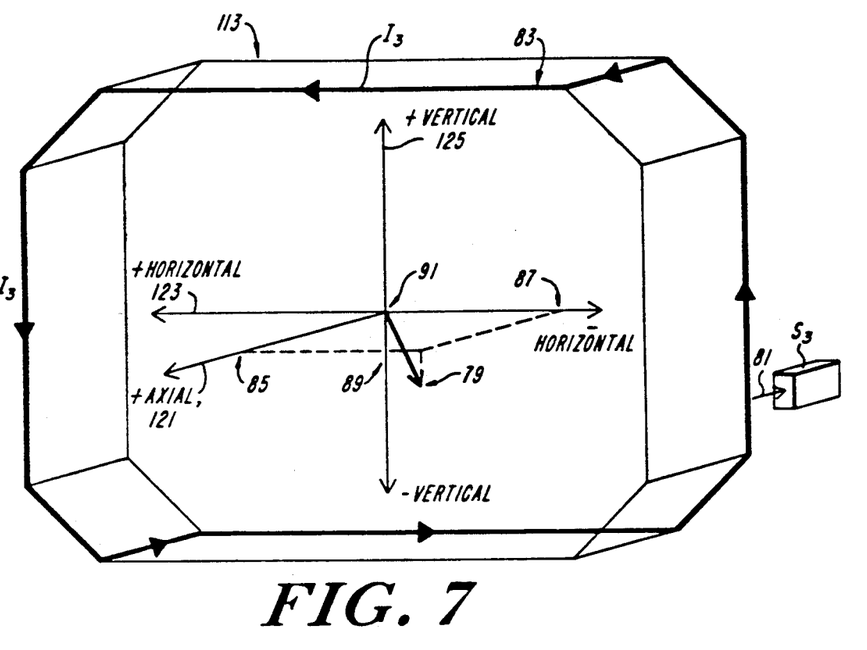
FIG. 7 is a diagram of coil 3 and sensor 3.

FIG. 6 shows coil 71 and its associated sensor $S_2$. Coil 71 is nonplanar. Coil $S_2$ has components in each of the axial, horizontal and vertical fields. Coil 71 has the same shape as coil 55 but is rotated so that the sensor $S_2$ in the upper right hand corner has the same orientation to the coil as does sensor $S_1$ in FIG. 5. Because of the shape of coil 71, current flowing through the coil as shown in FIG. 7 generates a resultant magnetic field diagrammatically represented by vector 67. Vector 67 has components (73, 75 and 77) in each of the positive axial, negative horizontal and positive vertical directions respectively.

FIG. 7 shows coil 83 and its associated sensor $S_3$ positioned in the lower right hand corner. Coil 83 is nonplanar. Coil 83 has components in each of the axial, horizontal and vertical fields, and has the same shape as coils 55 and 71, and again is rotated so that it has the same orientation to sensor $S_3$ and coils 55 and 71 had to sensors $S_1$ and $S_2$ respectively. Because of the shape of coil 83, current flowing through the coil as shown in FIG. 7 generates a resultant magnetic field diagrammatically represented by vector 79. Vector 79 has components (85, 87 and 89) in each of the positive axial, negative horizontal and negative vertical directions respectively.

Figure 8:
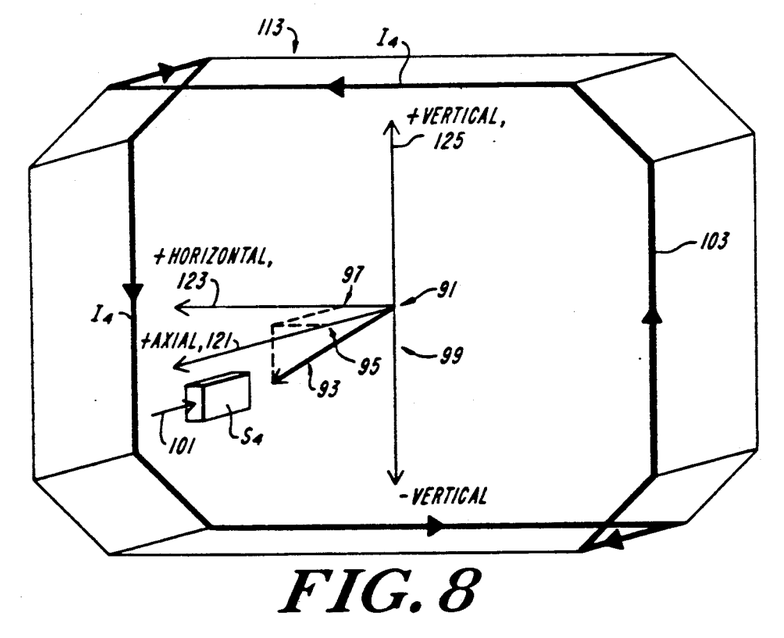
FIG. 8 is a diagram of coil 4 and sensor 4.

FIG. 8 shows coil 103 and its associated sensor $S_4$ positioned in the lower left hand corner. Coil 103 is nonplanar. Its shape corresponds to that of the other three coils and its orientation to its sensor $S_4$ is also the same. Coil 103 has components in each of the axial, horizontal and vertical fields. Because of the shape of coil 103, current flowing through the coil generates a resultant magnetic field diagrammatically represented by vector 93. Vector 93 has components (95, 97 and 99) in each of the positive axial, positive horizontal and negative vertical directions respectively.

Figure 9:
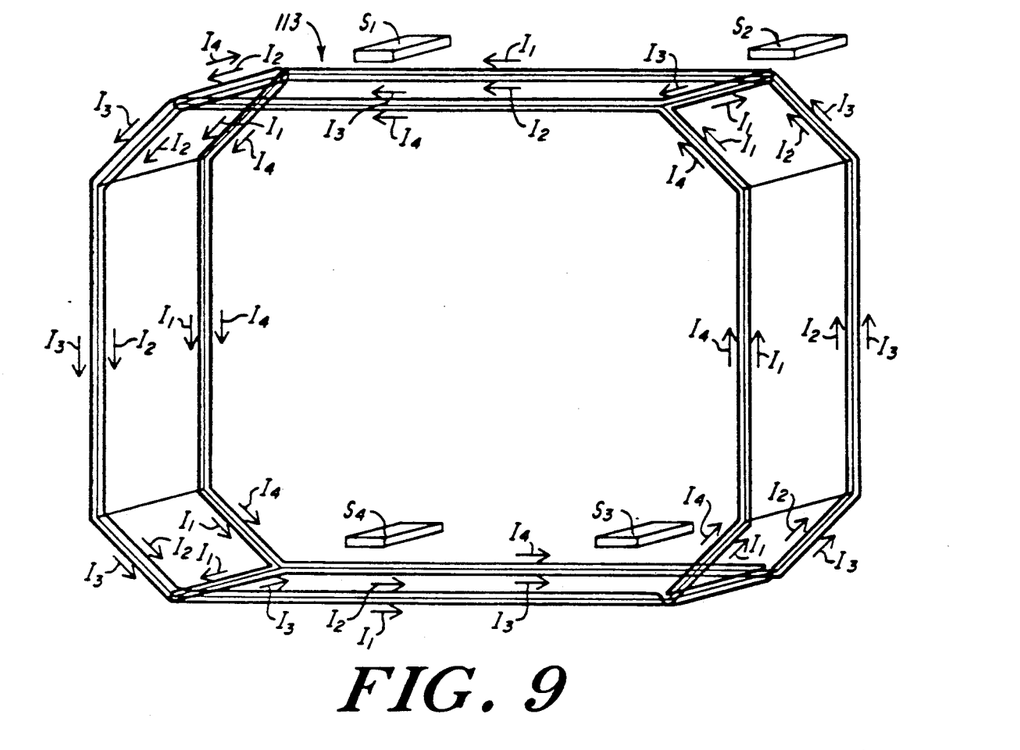
FIG. 9 is a composite drawing of coils 1-4 and sensors 1-4.

FIG. 9 shows four essentially axial coils. Each coil includes two edges along the front 49, two edges along the back 57, and two cross-overs 53.

The crossovers are arranged so that no two coils are in the front on the same two edges. The magnitude and shape of the magnetic field generated by the set of four coils will be determined by the magnitude and direction of currents applied to the coils in response to the sensed magnetic field at each sensor.

FEEDBACK NETWORK

Figure 13:
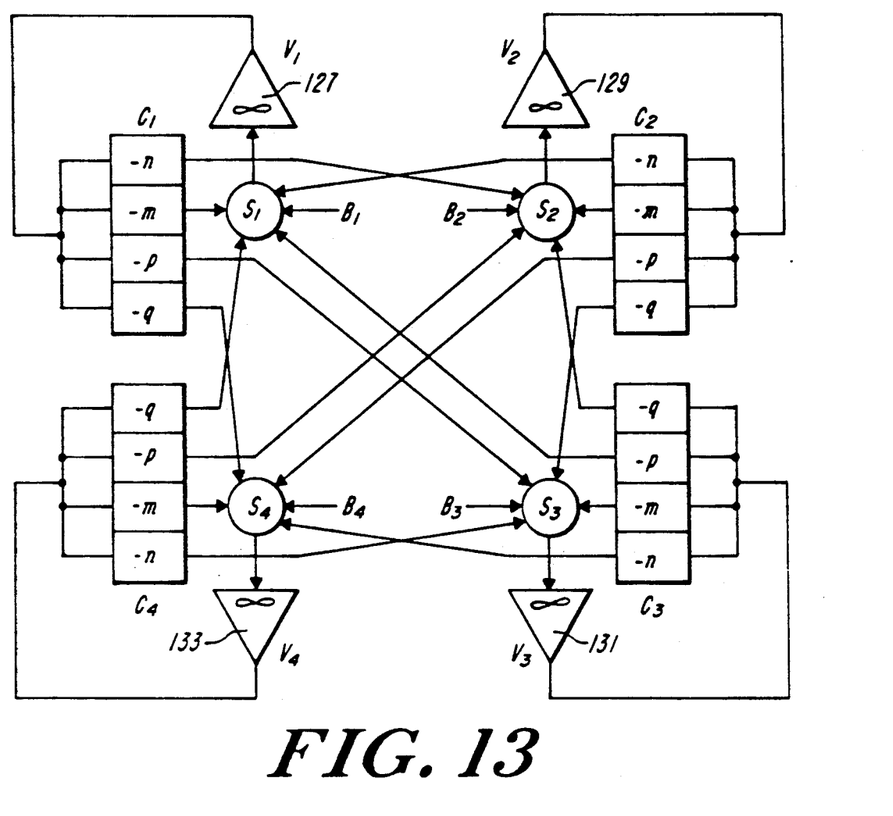
FIG. 13 is a diagram of the basic feedback control configuration.
Figure 14:
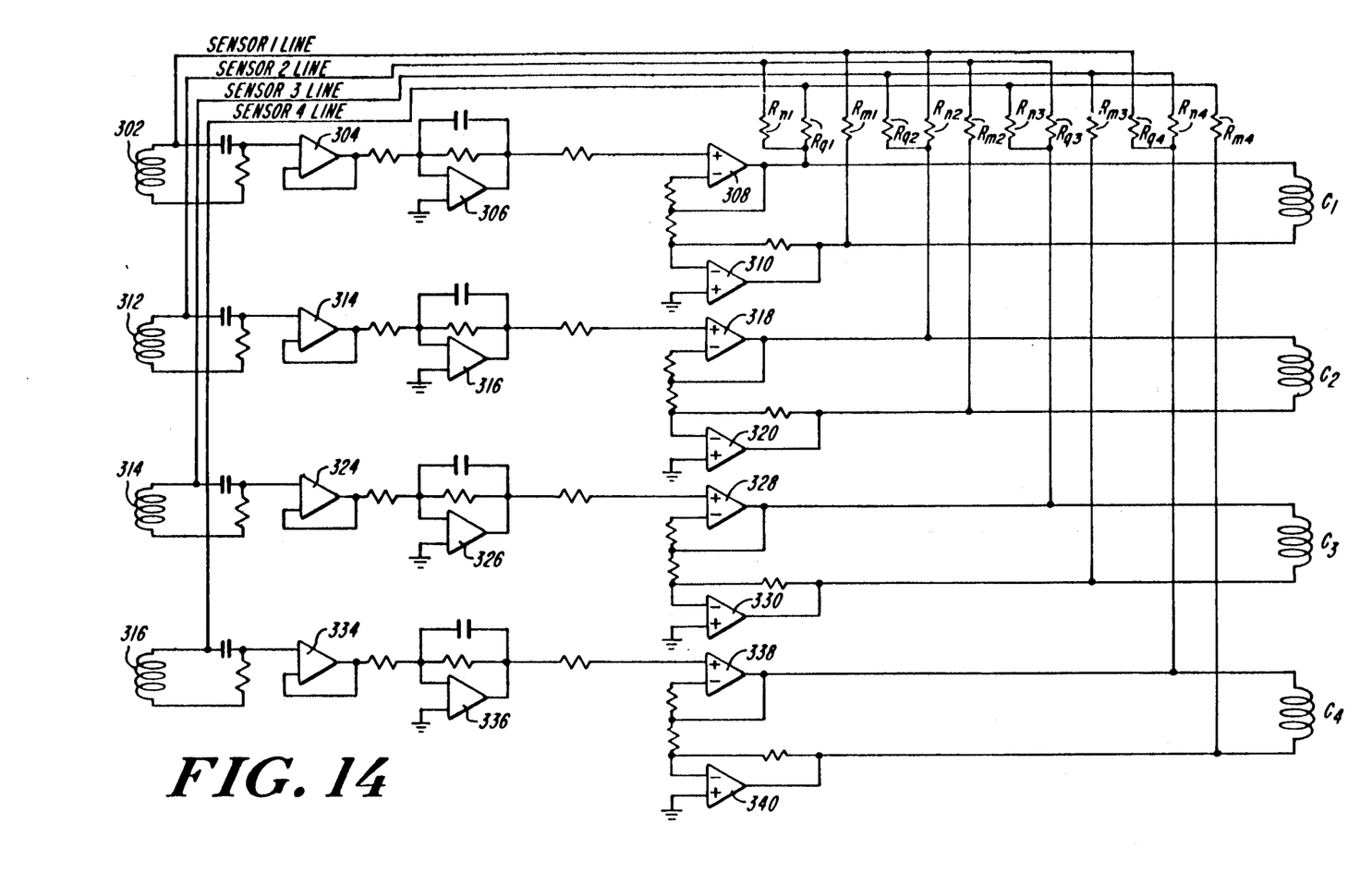
FIG. 14 is a schematic representation of one arrangement suitable for implementing the feedback control configuration of FIG. 13.

FIG. 13 shows a feedback network which responds to four magnetic field components $B_1$, $B_2$, $B_3$ and $B_4$ to produce at the output of each of the associated amplifiers 127, 129, 131, and 133 respectively, four voltages $V_1$, $V_2$, $V_3$ and $V_4$, that drive current through the four compensation coils $C_1$, $C_2$, $C_3$ and $C_4$. The composite magnetic field produced by the current flowing through the coils produces a field at each of the four sensors of the same magnitude but opposite polarity as the ambient vectors $B_1$, $B_2$, $B_3$, $B_4$, which are aligned with the sensors. Each of the four coils are magnetically coupled to provide a negative feedback to all four of the sensors. Thus, as any sensor detects, for example, an increase in field strength, the amplifier output drives the associated coil to generate an opposing field. Not only is this field magnetically coupled back to that sensor, by a coupling coefficient −m but it is also magnetically coupled through coupling coefficients identified as −n, −p, −q to the other three sensors. The negative sign indicates that the magnetic feedback is in a direction to oppose the direction of the originally sensed ambient field. It is important to note that, as illustrated in FIG. 14, a portion of each of the output voltages $V_1$ through $V_4$, are coupled through feedback resistors $R_m$, $R_n$ and $R_q$ to its own sensor and to the two neighboring sensors, thereby further adjusting (after calibration) for the contribution the magnetic fields generated by each of the coils $C_1$ through $C_4$, make at the neighboring sensors. Thus, the field is nulled at all four sensors simultaneously and compensation is achieved.

CALIBRATION OF THE COILS

In order to calibrate the coils initially, an external uniform magnetic field is established over a volume considerably larger than that occupied by the CRT 3 and compensation mechanism. The strength of the field should be greater than the maximum specified for the compensation system. For convenience the direction of the field is reversible. Also for convenience the field can be established exclusively along each of the three mutually perpendicular axes 121, 123 and 129. The monitor is placed within the field such that the axis 121 coincides with a vector perpendicular to the center of the image area on the CRT (along the axis of the electron beam).

Next, electric current is supplied to the compensation coils from a variable d.c. source. This is done to calibrate the effect of the coils separately from any feedback mechanism. The set of coils is calibrated separately for each of the three axes. During calibration, all coils carry the same amount of electrical current. To compensate for an axial field only, all of the coils are connected such that they carry current of the same polarity around the axial vector (either clockwise or counterclockwise with respect to the front of the CRT). To compensate for a horizontal field only, the coils are connected such that coils $C_1$ and $C_4$ carry current of the same polarity and coils $C_2$ and $C_3$ carry current of the opposite polarity. Compensation for a vertical field only is accomplished when coils $C_1$ and $C_2$ carry current of the same polarity and coils $C_3$ and $C_4$ carry current of the opposite polarity.

When an external axial ambient magnetic field is generated it produces a noticeable loss of color purity and rotation of the raster. Compensation current is applied and adjusted until it is of the correct polarity and amplitude to provide the optimum restoration of color purity to the CRT 3. Typically the video signal displayed on the CRT 3 will be an entire raster of a single color of constant level. This facilitates establishing when color purity is optimized.

The magnitude and polarity of the current for optimal compensation to an axial ambient field is then recorded. Similarly, the currents for compensation of horizontal and vertical ambient fields are also established and recorded. These recorded current values are very similar to one another and make up for imperfections and inequalities in the set of coils.

FEEDBACK CALIBRATION

Each sensor feedback factor m, n, p and q is individually optimized for each of the three axes of ambient magnetic vectors. This is done while driving all four of the coils in parallel from the output of only the one sensor which is being calibrated. Since all coils are wound from the same length of the same gauge wire, each has the same resistance and will carry the same amount of current when they are connected in parallel across the output drive voltage generated in response to the signal from the sensor being calibrated. Each sensor is calibrated, separately from the others and for each axis, as follows.

For calibration of sensor $S_1$, the four coils are connected to carry current in the same direction around the axial vector and are connected to the output drive corresponding to sensor $S_1$. Sensors $S_2$, $S_3$ and $S_4$ are temporarily disconnected from the coils. When an ambient axial field is applied to sensor $S_1$, the voltage $V_1$ developed at the output of amplifier 127 causes current in the compensation coils which produce a magnetic field at sensor $S_1$ in opposition to the ambient field. This is the basic negative feedback mechanism of the automatic compensation system. The sensors are located and oriented such that, before calibration, the voltage $V_1$ produced by amplifier 127 to null the sensor $S_1$ has greater magnitude than is required for optimum color purity restoration. Calibration for the axial compensation is accomplished by connecting a variable resistor from the voltage drive to coil $C_1$ into the pickup coil of sensor $S_1$. The other side of the pickup coil is connected to ground. This causes a current to flow through the pickup coil and thereby generate a local field which further opposes the ambient vector at the sensor.

This situation then requires less voltage at the coil driver to null the sensor. The variable resistor is adjusted until the voltage at the coil driver matches that required for optimum axial compensation. The value of the resistor is measured and recorded as $R_{A1}$.

For calibration of horizontal and vertical ambient fields the procedure is repeated producing $R_{H1}$ and $R_{V1}$. The compensation coils are reconfigured to produce horizontal or vertical fields. The correct feedback resistors $R_{H1}$ and $R_{V1}$ are determined and recorded.

The procedure is then repeated for sensors $S_2$, $S_3$ and $S_4$. When connecting the coil set for axial correction all currents have the same polarity. In the horizontal calibration for sensors $S_1$ and $S_4$ the currents in coils $C_1$ and $C_4$ are positive, while the currents in coils $C_2$ and $C_3$ are negative. During horizontal calibration of sensors $S_2$ and $S_3$ the currents in coils $C_1$ and $C_4$ are again positive, while current in coils $C_2$ and $C_3$ are negative. Similarly, during vertical calibration of sensors $S_1$ and $S_2$, the currents in coils $C_1$ and $C_2$ are positive, and the currents in coils $C_3$ and $C_4$ are negative. During vertical calibration of sensors $S_3$ and $S_4$ the currents in $C_1$ and $C_2$ are positive while those in $C_3$ and $C_4$ are negative.

After values of $R_{AX}$, $R_{HX}$, $R_{VX}$, (X = 1,2,3,4) are determined, the following set of calculations is performed:

$$R_{mx} = 2 \frac{R_{HX} R_{VX}}{R_{AX} + R_{VX}}$$

$$R_{nx} = 2 \frac{R_{AX} R_{HX}}{R_{HX} - R_{AX}}$$

$$R_{qx} = 2 \frac{R_{AX} R_{VX}}{R_{VX} - R_{AX}}$$

The resistors $R_{mx}$, $R_{nx}$, $R_{qx}$ are installed between the pickup coil for sensor X from respectively, the coil driver for coil X, the coil driver for the horizontal neighbor and the coil driver for the vertical neighbor. These connections are summarized in the following table:

| Sensor Pickup Coil | Coil Driver 1 | 2 | 3 | 4 |
|---|---|---|---|---|
| 1 | $R_{m1}$ | $R_{n1}$ | — | $R_{q1}$ |
| 2 | $R_{n2}$ | $R_{m2}$ | $R_{q2}$ | — |
| 3 | — | $R_{q3}$ | $R_{m3}$ | $R_{n3}$ |
| 4 | $R_{q4}$ | — | $R_{n4}$ | $R_{m4}$ |

If the calculated value of a resistor is negative, then the connection of that resistor is made to the inverted coil driver for that sensor.

OPERATION

FIG. 9 depicts a composite diagram including all four sensors and coils, and shows the circuits in each coil as previously discussed. The output of sensor 1, $V_1$, drives coil $C_1$ and similarly for sensor/coil pairs 2, 3 and 4. The outputs of the sensor electronics are proportional to the time integral of the magnetic field vector aligned with the sensor. If the field is nulled at the sensor, then its output remains constant. The drive from each sensor output is arranged so that it produces a current in the corresponding compensation coil which reduces the field at that sensor. The field produced also has an influence on each of the other sensors. There is a high degree of symmetry in this interaction.

When, the system illustrated in FIG. 13 is in equilibrium, the following calculations are satisfied if the field at each sensor is zero.

$$B_1 = -mV_1 - nV_2 - pV_3 - qV_4$$

$$B_2 = -nV_1 - mV_2 - qV_3 - pV_4$$

$$B_3 = -pV_1 - qV_2 - mV_3 - nV_4$$

$$B_4 = -qV_1 - pV_2 - nV_3 - mV_4$$

The fact that all of the coupling coefficients are the same in each equation is established by symmetry. The coupling coefficient of the output of each sensor back to itself is $-m$. The coupling coefficients to horizontal neighbor and vertical neighbor are respectively $-n$ and $-q$ and to the opposite corner, $-p$.

In equilibrium the current through each compensating coil $I_1$, $I_2$, $I_3$ or $I_4$ is proportional to the sensor output voltages $V_1$, $V_2$, $V_3$, $V_4$ and can be computed by simply dividing the corresponding voltage by the coil resistance (all coils have the same resistance, $R_c$), i.e. $I_1 = V_1/R_c$, etc.

When feedback equations are solved for $V_1$, $V_2$, $V_3$, $V_4$ in terms of $B_1$, $B_2$, $B_3$, $B_4$ the following formula is obtained:

$$V_i = -[B_i(M/D) + B_h(N/D) + B_j(Q/D) + B_k(P/D)]$$

The subscripts have the following definitions: i = self; h = horizontal neighbor; k = opposite corner, and j = vertical neighbor. Thus the symbols D, M, N, P, Q are defined as:

$$D = (m+n+p+q)(m+n-p-q)(m-n-p+q)(m-n+p-q)$$

$$M = m^3 - m(n^2+p^2+q^2) + 2npq$$

$$N = n^3 - n(m^2+p^2+q^2) + 2mpq$$

$$P = p^3 - p(m^2+n^2+q^2) + 2mnq$$

$$Q = q^3 - q(m^2+n^2+p^2) + 2mnp$$

Based on previous discussion, the following substitutions can be made.

$$B_1 = B_A + B_H + B_V$$

$$B_2 = B_A - B_H + B_V$$

$$B_3 = B_A - B_H - B_V$$

$$B_4 = B_A + B_H - B_V$$

The quantities $B_A$, $B_H$, $B_V$ are the strength of the component of the Axial, Horizontal and Vertical fields aligned with the axis of sensitivity at sensor $S_1$.

This leads to $$V_1 = -B_A K_A - B_H K_H - B_V K_V$$

$$V_2 = -B_A K_A + B_H K_H - B_V K_V$$

$$V_3 = -B_A K_A + B_H K_H + B_V K_V$$

$$V_4 = -B_A K_A - B_H K_H + B_V K_V$$

where $K_A = 1/(m+n+p+q)$; $K_H = 1/(m-n-p+q)$; $K_V = 1/(m+n-p-q)$; From this, it can be recognized that the feedback system responds to the axial component of the ambient field by supplying a current, $-B_A K_A/R_C$ to each of the compensation coils. In response to the horizontal component of the ambient field, a current, $-B_H K_H/R_C$ flows in coils 1 and 4, and a current of the same magnitude but opposite polarity, $B_H K_H/R_C$ flows in coils 2 and 3. Similarly, the response to a vertical field is currents, $-B_V K_V/R_C$ in coils 1 and 2, and $+B_V K_V/R_C$ in coils 3 and 4. comparing these results to the analysis of the compensation coils leads to the conclusion that the compensation system responds to any ambient field with currents in the four compensation coils that establish separate axial, horizontal and vertical fields which exactly null the components of the ambient field aligned with the sensor axis at each of the four sensors.

The invention utilizes the combination of the vectors 65, 67, 79 and 93. Due to the symmetry of the set of coils 113, the horizontal, vertical and axial components of the vectors can cancel each other when summed in various ways.

Figure 10:
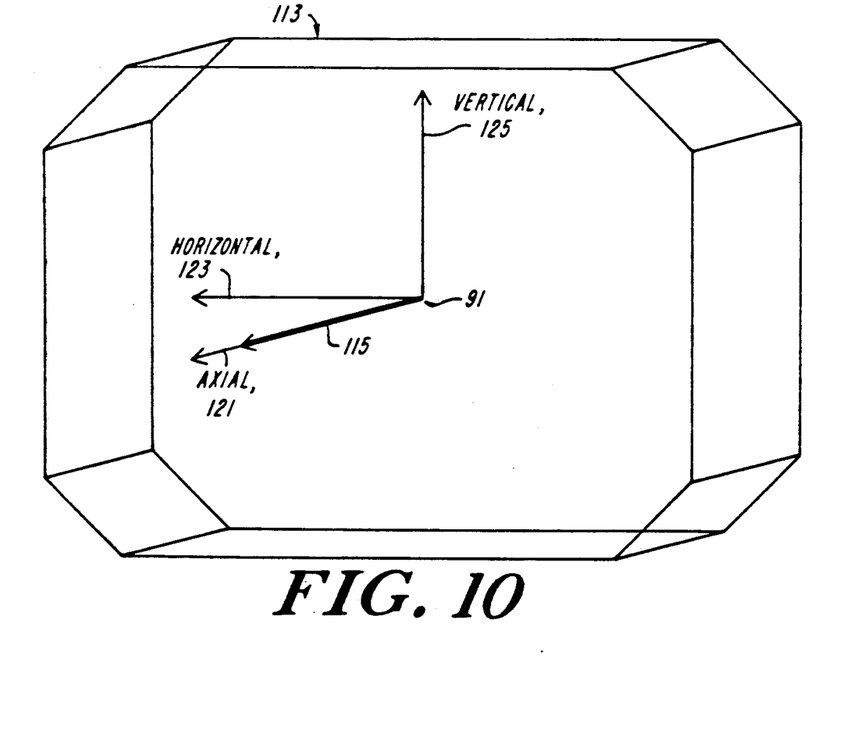
FIG. 10 is a representative drawing of the four coils with the direction of the supplied currents producing an axial magnetic field.

For example, when all four coils, $C_1$, $C_2$, $C_3$ and $C_4$, are driven with identical currents, the resultant magnetic field is aligned entirely along the axial direction. This is because horizontal components 61, 75, 87 and 97 cancel each other and vertical components 63, 77, 89 and 99 cancel each other. FIG. 10 shows the resultant vector 115 which results when positive currents of equal value are sent through coils $C_1$, $C_2$, $C_3$ and $C_4$.

Figure 12:
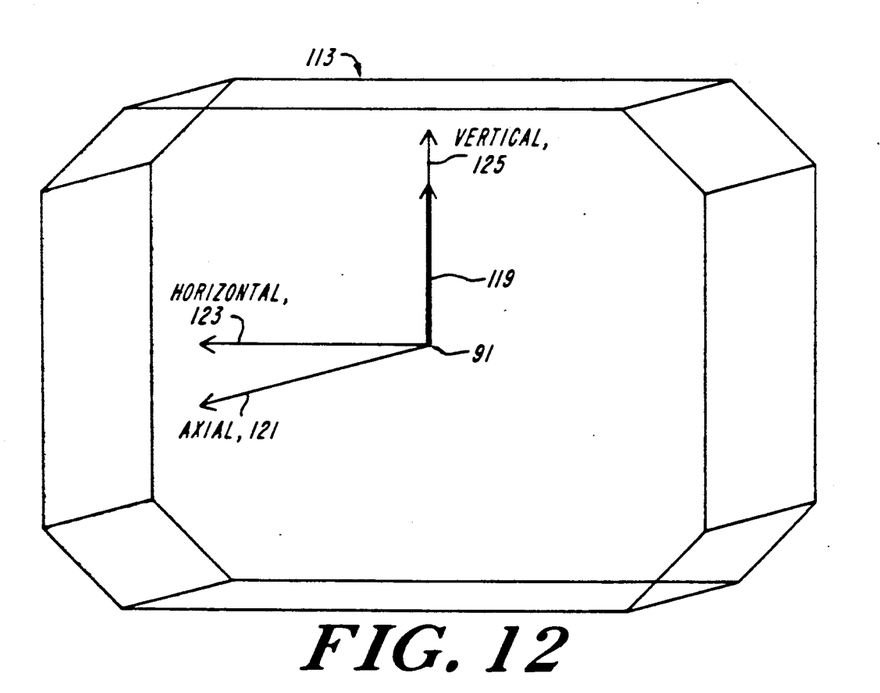
FIG. 12 is a representative drawing of the four coils with the direction of the supplied currents producing a vertical magnetic field.

FIG. 12 shows the resultant vector 117 which results when current $I_1$ is positive, current $I_2$ is negative, current $I_3$ is negative and current $I_4$ is positive. When all currents are of equal magnitude and the above polarities, the resultant vector 117 is entirely in the horizontal direction.

FIG. 12 shows the resultant vector 119 which results when current $I_1$ is positive, current $I_2$ is positive, current $I_3$ is negative and current $I_4$ is negative. When all currents are of equal magnitude and the above polarities, the resultant vector 119 is entirely in the vertical direction.

Figure 11:
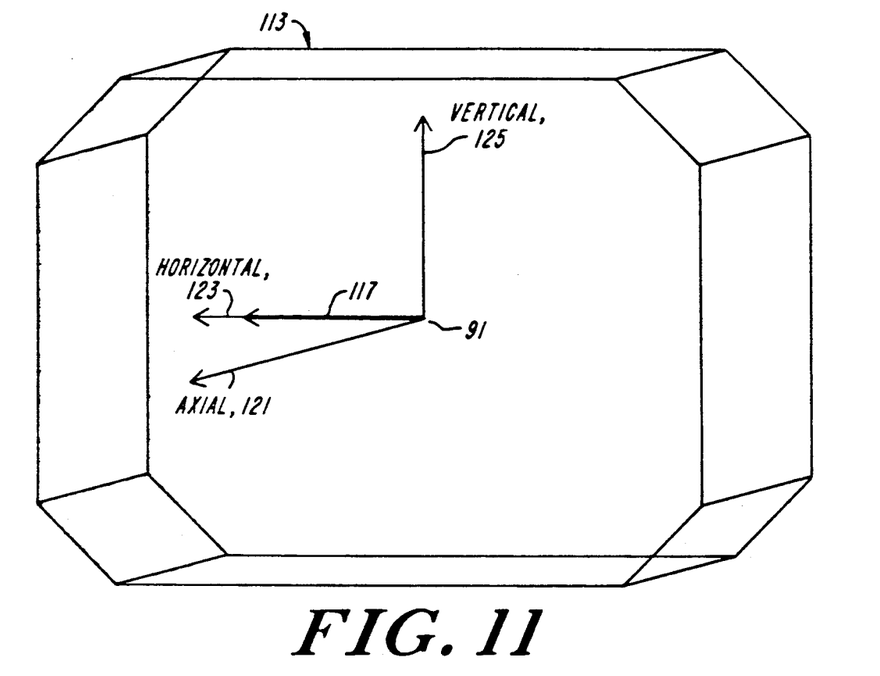
FIG. 11 is a representative drawing of the four coils with the direction of the supplied currents producing a horizontal magnetic field.

The fact that the coils are all of equal size and have a common center point 91 allows for the individual resultant vectors 65, 67, 79 and 93 to create sum vectors 115, 117 and 119. The apparatus of the invention allows for the magnitudes of the currents $I_1$, $I_2$, $I_3$ and $I_4$ to be equal. Other coil configurations which are centered at point 91 and create magnetic fields similar to those represented by vectors 65, 67, 79 and 93 could similarly be used.

Each of the coils is shown to be nonplanar in the preferred embodiment. However, the resultant vectors 65, 67, 79 and 93 could all be created by planar coils centered at point 91. The planar coils would each have to be tilted away from the horizontal and vertical axes such that their resultant vectors would add in a similar fashion to the present invention. Fabricating such a set of planar coils would, however, be more difficult because the coils would have to cross one another. Because of this, the coils would have to be of varying sizes to fit within one another. If the coils were of varying sizes, then varying currents would have to be sent through the coils to cause them to cancel in the fashion of the present invention. The present invention makes more efficient use of the symmetry of the resultant vectors 65, 67, 79 and 93.

FIG. 14 illustrates a specific implementation of the present embodiment. In this embodiment, the sensors employed are flux gate sensors which employ a specific readout coil to provide the output signal indicative of the magnetic field at the sensor. This sensor pickup coil has a low impedance, typically less than 10 ohms. As indicated in FIG. 14, the non-grounded end of sensing coil 302, which forms a part of sensor 1 of this coil is connected to the input of operational amplifier 304, the output of which is coupled to a second operational amplifier 306, configured to serve as an integrator. The output from the integrator is coupled to an output amplifying stage including a positive driver 308 and a negative driver 310 to drive the associated compensation coil $C_1$. The outputs of driver stages 308 and 310 are connected through three adjustable feedback resistors $R_{m1}$, $R_{n1}$, and $R_{q1}$ to the non-grounded end of sensor pickup coils 302, 312, and 332. Similarly, the corresponding output stages for each of the other channels corresponding to sensors $S_2$, $S_3$, and $S_4$, are fed back through corresponding adjustable resistors, to the non-grounded end of their own sensing coils (through adjustable resistors $R_{m2}$, $R_{m3}$, and $R_{m4}$) and to the non-grounded end of the sensing coils of the sensors immediately adjacent to them (through adjustable resistors $R_{n1}$, $R_{n2}$, $R_{n3}$, and $R_{q1}$, $R_{q2}$, and $R_{q3}$). The feedback currents at each of the sensing coils have the effect of changing the magnetic field in a very localized area where the coil is located, so that each sensor output is not only indicative of the general ambient magnetic field in which it is located, but is also changed by the effect of the magnetic field generated by its sensing coil in response to these feedback currents. Thus, as described in the calibration procedures outlined above, the feedback resistors can be said to provide for a symmetrical response to the ambient fields as sensed by each of the sensors, for nulling the magnetic field in the entire enclosed volume. These adjustments restore symmetry which may have been lost due to inexact physical properties of coils, sensors, and shield as constructed.

DEPERMING SYSTEM

A system for providing both passive ($\mu$ metal shield) neutralizing of ambient magnetic fields and active neutralizing by generating a compensation field equal in magnitude, but opposite in direction to the ambient magnetic field, has been described above.

However, physical design constraints may limit the effectiveness of passive magnetic shielding and of compensation coils of any configuration.

In the practice of a system with the Presently disclosed compensation coils and sensor configuration within a CRT, a deperm cycle is performed when the system is first activated. In deperming, any elements of the system that tend to become permanently magnetized become degaussed, removing any prior magnetization while establishing a pattern of magnetization within them opposing the ambient field. This is accomplished by driving the magnetically permeable material with an initially strong, underdamped magnetic field to saturation, alternately in one direction and then the other, the amplitude being gradually diminished to zero. Thereafter the compensation coils may operate to effectively null the ambient magnetic field within the CRT volume. However, the active nulling of the coils may not provide adequate local field suppression in the presence of a particularly strong ambient field. This invention, therefore includes an automatic deperming system which can assist various shield, coil and sensor configurations in order to reduce the effect of even strong or persistent ambient magnetic fields within a defined volume. Thus an arrangement is provided where an initially activated equipment, such as a CRT, is depermed and then is again depermed whenever the magnitude of the ambient field rises outside the operative range of an associated active compensation coil arrangement. This subsequent deperming, in conjunction with the continued active compensation of the coil arrangement, is designed to compensate for locally perturbing ambient fields to a point where the equipment operation, such as CRT image generation, is within operating specifications.

Figure 15:
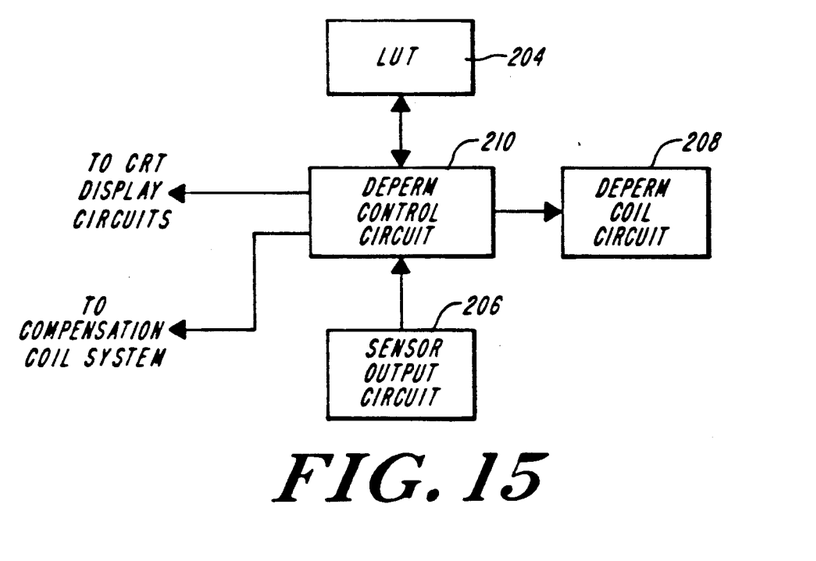
FIG. 15 is a block diagrammatic illustration of a deperming circuit.

An illustrative embodiment of a deperm system for the present invention is shown in FIG. 15. The deperm system operates in a volume such as that illustrated in FIG. 1, where ambient magnetic fields are sought to be nulled within a given range of specification. The deperm system includes a permanent look-up table (LUT) 204 which stores a deperm schedule, a sensor output circuit 206 which typically includes a plurality of coils and sensors as illustrated in FIG. 4 through 12 for interaction with the ambient magnetic field in the equipment volume, and a deperm circuit 208 which includes at least one deperm coil (not shown) for deperming the volume containing the CRTs. The deperm coil is typically a single large coil, for example, 80 turns of No. 10 copper wire wound around the CRT in a plane normal to the electron beam axis and positioned behind the compensation coils. A deperm control circuit 210 receives input signals from sensor output circuit 206, indicating the values of the x, y and z components of the ambient field. The deperm control circuit 210 provides information to and receives information from LUT 204, generating a control output to deperm coil circuit 208 to energize the deperm coil according to both a prescheduled program and to a comparison of the signals received from sensor output circuit 206 and the values in LUT 204.

The LUT maps a plurality of operating points which may possibly be encountered within the equipment volume. A given stored operating point, for example, represents a respective value of each of the three orthogonal x, y, z components of a sensed ambient magnetic field within the volume containing the CRT. The LUT stores a plurality of x, y, z operating point sets; the breadth of this plurality of stored sets is predetermined experimentially.

The LUT also maps the acceptable range of variation around a given x, y, z operating point which is within the nulling capability of the compensating coils 55, 71, 83 and 103. For example, along with the magnitude of the x, y, z components which defines a particular operating point, the limit values (maximum and minimum) for this point, are stored. Outside of these values the compensation coils are considered to be incapable of efficiently nulling the local ambient field.

Initially the values of acceptable range for the x, y, z defined points are determined during the system calibration procedure with the determination of acceptable maximum and minimum departure from the field value for each defined point being selected on the basis of sensitivity of color imperfections to particular field components. In practice, the color imperfections are most sensitive to variations in the axial (z) field, next most sensitive to variations in the horizontal (x) field, and least sensitive to variations in the vertical (y) field.

In operation, control circuit 210 initiates a deperm cycle when the equipment is first powered-on. After completion of this deperming cycle, the x, y, z components of the ambient field in the volume are detected by circuit 206 and are employed by control circuit 210 as a baseline set of components for a specific operating point having the values of this baseline set already listed within LUT 204. Control circuit 210 now continues to monitor the ambient field component values detected by circuit 206 and to compare on a continuous basis these readings to the acceptable deviation range of min/max component values associated with the present baseline operating point as listed in the LUT. When circuit 206 senses field components beyond the acceptable limits of the range associated with the particular operating point, then control circuit 210 temporarily holds constant the output of circuit 206, holding constant operation of the compensation coils. It also initiates a new deperm cycle, thereafter reenables circuit 206, and selects a new baseline operating point based on the value of the field components detected by circuit 206 after completion of the new deperm cycle. Now the control circuit adopts a new baseline operating point (with a new associated min/max range) and controls the system accordingly.

In a preferred embodiment of the invention, the equipment is a CRT device, and the detection and control circuit 206 includes the coil/sensor configuration of FIGS. 4–12.

Thus, the compensation coils act to minimize the ambient field in the volume of interest for so long as the value of the field components does not exceed the limits of the range within which the compensation coils and their drive circuit are effective. This range is expressed in the LUT min/max range associated with a given operating point.

When control circuit 210 initiates a deperm cycle, a blanking command is issued from the controller to a CRT display circuit, which in turn temporarily blanks the display. But because this blanking temporarily disrupts the viewed image, it is desirable to limit the duration of the deperming cycle. Hence, the system is preferably provided with a "high speed deperm circuit" which performs deperming in about 1/20 second. This limits the observed blanking action to a short blink of the display.

Under conditions when automatic deperming and blinking might be considered to be too distracting to the observer, the system can be provided with a capability for the observer to inhibit automatic deperm action. However, the system preferably continues to compute magnetic ambient field changes and may signal the operator via an on-screen indicator or a small lamp next to the display that a manually initiated deperm cycle will improve image quality.

Figure 16:
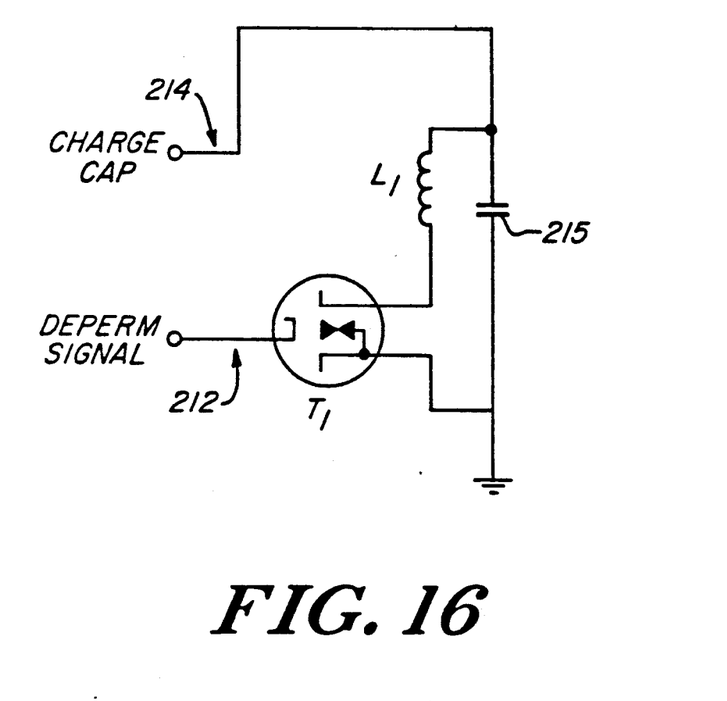
FIG. 16 is a charging circuit for use in the deperming circuit of FIG. 15.

FIG. 16 illustrates a suitable drive circuit for the deperm coil 215. control circuit 210 provides a deperm signal on terminal 212 which triggers transistor $T_1$, discharging capacitor 215 through deperming coil $L_1$. Suitable values for the components are 200 to 400 $\mu f$ for capacitor 215, and 5–10 mh for coil $L_1$. A suitable transistor $T_1$ is FET. S.N. IRF-250. A capacitor charging current is supplied to terminal 214 from deperm coil circuit 208.

It will thus been seen that the objects set forth above, among those made apparent from the preceding description, are efficiently attained. It will be understood that changes may be made in the above constructions and in the foregoing sequences of operation without departing from the scope of the invention. It is accordingly intended that all matter contained in the above description or shown in the accompanying drawings be interpreted as illustrative rather than limiting.

Accordingly, what is claimed is:

1. Apparatus for nulling an ambient magnetic field in a volume including magnetically permeable material comprising,
   detection means for detection of said ambient magnetic field in said volume,
   compensation means for nulling the ambient field in said volume within a predetermined compensation range of value of the ambient magnetic field, the predetermined compensation range being considered as the range within which the compensation means is effective to null said ambient field,
   deperming means for nulling of at least a portion of the ambient field by inserting a magnetizing field independent of said compensation means into said volume, and
   controller means coupled to the detection means, compensation means and deperming means for maintaining constant the compensation means when the value of the ambient magnetic field detected by the detection means becomes greater than the predetermined compensation range, and for activating the deperming means to insert its magnetizing field into the volume to establish a new operating point about which the compensation means has a new but predetermined compensation range.

2. Apparatus for nulling the x, y, z orthogonal field components of an ambient magnetic field in a volume including magnetically permeable material comprising,
   detection means for detection of the x, y, z components of said ambient magnetic field in said volume,
   compensation means for nulling the x, y, z components of the ambient field in said volume within a pre-determined compensation range of values of the x, y, z field components of the ambient magnetic field, the predetermined compensation range being considered as the range within which the compensation means is operable at that time to effectively null said ambient field,
   deperming means for nulling of at least a portion of the ambient field by inserting a magnetizing field independent of said compensation means into said volume, and
   controller means coupled to the detection means, compensation means and deperming means for holding constant the compensation means when the value of the x, y, z components of the ambient magnetic field detected by the detection means exceeds the limits of the predetermined compensation range, and for activating the deperming means to insert its magnetizing field into the volume to establish a new x, y, z defined operating point about which the compensation means has a new but predetermined compensation range.

3. Apparatus in accordance with claim 2 wherein the detection means comprises a plurality of magnetic sensors.

4. Apparatus in accordance with either of claims 1 or 2 wherein a shadow mask cathode ray tube is contained within said volume.

5. Apparatus in accordance with claim 2 wherein said compensation means includes a plurality of electromagnetic coils.

6. Apparatus in accordance with claim 5 wherein said compensation means includes a series of electromagnet coils, each coil being similarly configured, but differently oriented with respect to each other and to said volume.

7. Apparatus in accordance with claim 6 wherein the detection means comprises a plurality of magnetic sensors, each associated with one of said coils, and wherein each coil is oriented the same with respect to the associated one of said sensors.

8. Apparatus in accordance with claim 6 wherein the compensation means comprises four coils.

9. Apparatus of claim 2 wherein the magnetically permeable material within the volume includes a shadow mask cathode ray tube and wherein said deperming means comprises an electromagnetic coil generating an initially strong underdamped magnetic field oriented along one of said x, y or z axes.

10. Apparatus in accordance with claim 8 wherein the deperming means comprises an electromagnet coil having a plurality of turns around an axis generally parallel to the electron beam axis of said cathode ray tube.

11. Apparatus in accordance with claim 2 wherein the controller means comprises a table means for expressing acceptable operating limits of the system, wherein for a given set of values of the x, y, z components of the ambient field establishing a selected operating point of the system, the table means expresses a selected predetermined compensation range within which the compensation means is considered to be operable at said selected operating point.

12. Apparatus in accordance with claim 11 wherein the controller means activates the compensation means when the present value of the x, y, z, components of the ambient magnetic field are within the selected predetermined compensation range at the selected operating point, and activates the deperming means when the present value of the x, y, z, components of the ambient magnetic field exceeds the limits of the selected predetermined compensation range at the selected operating point.

13. Apparatus for controlling the x, y, z orthogonal components of an ambient magnetic field detected within a given volume of a cathode ray tube device, the apparatus comprising
   a controller,
   a cathode ray tube display circuit coupled to said controller,
   a deperming means, coupled to the controller, for generating a magnetic field within the given volume,
   a detection and compensation means, coupled to the controller, for detection and resolution of sets of the x, y, z field components,
   a storage means, coupled to the controller,
      (a) for storing a collection of predetermined sets of ambient magnetic field x, y, z components which are deemed acceptable within the given volume of operation of the cathode ray tube device, and
      (b) for storing an acceptable range of deviation of the ambient field components for each such stored predetermined related set according to the characteristics of the cathode ray tube device, and,
   the controller employing a selected one of the sets of the x, y, z field components as a baseline set, and issuing a deperm command to the deperming means, and to the cathode ray tube display circuit to blank the cathode ray tube display during the deperm operation, when the detection and compensation means detects a set of the x, y, z field components which are outside of the acceptable range the deviation stored in the storage means related to the baseline set.

14. A method for nulling an ambient magnetic field in a volume including magnetically permeable material comprising the steps of,
 a) detecting said ambient magnetic field in said volume,
 b) generating a first magnetic field for nulling the ambient field in said volume within a predetermined compensation range of value of the ambient magnetic field, the predetermined compensation range being the range within which the first magnetic field is effective to null said ambient field,
 c) determining whether at any given time the value of said magnetic field in said volume exceeds the limits of said predetermined control range,
 d) holding constant the generation of said first magnetic field when it is determined that the value of the ambient magnetic field exceeds the limits of the predetermined compensation range,
 e) generating a second magnetizing field in said volume to establish a new operating point about which the compensation means has a new but predetermined compensation range.

15. A method for nulling the x, y, z orthogonal field components of an ambient magnetic field in a volume including magnetically permeable material comprising the steps of,
 a) detecting the x, y, z components of said ambient magnetic field in said volume,
 b) generating a first magnetic field for nulling the x, y, z components of the ambient field in said volume within a predetermined compensation range of values of the x, y, z field components of the ambient magnetic field, the predetermined compensation range being the range within which the first magnetic field is effective to null said ambient field,
 c) determining whether at any given time, the value of said ambient magnetic field in said volume exceeds the limits of said predetermined compensation range
 d) holding constant the generation of said first magnetic field when it is determined that the value of the x, y, z components of the ambient magnetic field detected lies outside the predetermined control range, and
 e) generating a second magnetic field into the volume to establish a new x, y, z defined operating point about which the compensation means has a new but predetermined compensation range.

16. A method in accordance with claim 15 wherein a shadow mask cathode ray tube in included within the volume, said cathode ray tube having its electron beam axis generally aligned with said z component, and wherein said second magnetic field is oriented along said z component.

17. A method in accordance with claim 16 wherein said second magnetic field is generated by an electromagnet coil having a plurality of turns around an axis generally parallel to the electron beam axis of said cathode ray tube.

18. A method in accordance with claim 15 wherein the step of determining whether the ambient field exceeds the limits of the compensation range comprises,
 establishing a look up table for expressing acceptable operating limits of the system, and wherein for a given set of values of the x, y, z components of the ambient field defining a selected operating point of the system, said determination is made by looking up in the table the selected predetermined compensation range within which the first magnetic field can be operable at said selected operating point.

19. A method in accordance with claim 15 wherein the step of determining whether the ambient field exceeds the limits of the compensation range comprises,
 establishing a look up table for expressing acceptable operating limits of the system, such that for a given set of x, y, z values of said ambient field defining a selected operating point, said table expresses the value of said predetermined compensation range, and
 looking up said predetermined compensation range in said table for the detected ambient field value to determine whether said value exceeds the limits of said compensation range.

20. A method in accordance with claim 18 wherein said look up table comprises a storage means,
 for storing a collection of predetermined sets of ambient magnetic field x, y, z components which are deemed acceptable within the given volume of operation of the CRT device, and
 for storing an acceptable range of deviation of the ambient field components for each such stored predetermined related set according to the characteristics oft he cathode ray tube device, and,
 wherein said determination is made by employing a selected one of the sets of the x, y, z field components as a baseline set, and determining that the detected value of said ambient field at any given time exceeds the limits of the compensation range when the detected value represents a set of the x, y, z field components which exceeds the limits of the acceptable range of deviation stored in the storage means related to that baseline set.

* * * * *